US010192448B2

(12) United States Patent
Moreira-Matias et al.

(10) Patent No.: US 10,192,448 B2
(45) Date of Patent: Jan. 29, 2019

(54) METHOD TO CONTROL VEHICLE FLEETS TO DELIVER ON-DEMAND TRANSPORTATION SERVICES

(71) Applicant: NEC Europe Ltd., Heidelberg (DE)

(72) Inventors: Luis Moreira-Matias, Heidelberg (DE); Amal Saadallah, Sousse (TN); Jihed Khiari, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 168 days.

(21) Appl. No.: 15/281,142

(22) Filed: Sep. 30, 2016

(65) Prior Publication Data

US 2018/0096606 A1   Apr. 5, 2018

(51) Int. Cl.
| | | |
|---|---|---|
| *G08G 1/00* | (2006.01) | |
| *G05D 1/02* | (2006.01) | |
| *G07C 5/08* | (2006.01) | |
| *G06Q 50/30* | (2012.01) | |
| *G05D 1/00* | (2006.01) | |

(52) U.S. Cl.
CPC ........... *G08G 1/202* (2013.01); *G05D 1/0088* (2013.01); *G05D 1/0291* (2013.01); *G06Q 50/30* (2013.01); *G07C 5/08* (2013.01); *G08G 1/205* (2013.01); *G05D 2201/0213* (2013.01)

(58) Field of Classification Search
CPC ...... G08G 1/202; G08G 1/205; G05D 1/0291; G05D 1/0088; G05D 2201/0213; G07C 5/08; G06Q 50/30
See application file for complete search history.

(56) References Cited

U.S. PATENT DOCUMENTS

| | | | |
|---|---|---|---|
| 9,933,779 B2 * | 4/2018 | Ross | B60W 50/029 |
| 10,026,506 B1 * | 7/2018 | LaBorde | G16H 10/65 |
| 2011/0099040 A1 | 4/2011 | Felt et al. | |
| 2011/0246404 A1 * | 10/2011 | Lehmann | G06Q 10/02 706/21 |
| 2012/0130627 A1 | 5/2012 | Islam et al. | |
| 2015/0081362 A1 | 3/2015 | Chadwick et al. | |

(Continued)

FOREIGN PATENT DOCUMENTS

| | | |
|---|---|---|
| JP | 2004295576 A | 10/2004 |
| JP | 2005346634 A | 12/2005 |

OTHER PUBLICATIONS

"Automotive revolution-perspective towards 2030: How the convergence of disruptive technology-driven trends could transform the auto industry", McKinsey&Company, Advanced Industries, Jan. 2016, pp. 1-20.

(Continued)

*Primary Examiner* — Frederick M Brushaber
(74) *Attorney, Agent, or Firm* — Leydig, Voit & Mayer, Ltd.

(57) ABSTRACT

A method for providing dispatching services for an on-demand transportation (ODT) service includes determining that a predictive assignment message should be transmitted to a vehicle, generating, in response to the determining that a predictive assignment should be transmitted to a vehicle, the predictive assignment message, and transmitting, to the vehicle, the predictive assignment message. Generating the predictive assignment message uses one or more prediction models computed from historical and real-time ODT service data.

20 Claims, 3 Drawing Sheets

(56) References Cited

U.S. PATENT DOCUMENTS

| | | | | |
|---|---|---|---|---|
| 2015/0161564 A1* | 6/2015 | Sweeney | G06Q 10/063114 |
| | | | 705/338 |
| 2015/0161752 A1* | 6/2015 | Barreto | G06Q 50/30 |
| | | | 705/7.15 |
| 2015/0206267 A1* | 7/2015 | Khanna | G06Q 50/30 |
| | | | 705/5 |
| 2015/0294422 A1* | 10/2015 | Carver | G06Q 40/08 |
| | | | 705/4 |
| 2016/0120890 A1* | 5/2016 | Singh | A61K 45/06 |
| | | | 514/35 |
| 2016/0129787 A1* | 5/2016 | Netzer | B60K 35/00 |
| | | | 701/36 |
| 2016/0247109 A1* | 8/2016 | Scicluna | G06Q 10/06315 |
| 2016/0300318 A1* | 10/2016 | Godil | G06Q 50/30 |
| 2016/0335576 A1* | 11/2016 | Peng | G06Q 10/06315 |
| 2016/0360336 A1* | 12/2016 | Gross | H04W 4/025 |
| 2016/0360382 A1* | 12/2016 | Gross | G06F 3/0488 |
| 2017/0090480 A1* | 3/2017 | Ho | G05D 1/0214 |
| 2017/0352125 A1* | 12/2017 | Dicker | G06Q 50/30 |
| 2018/0096606 A1* | 4/2018 | Moreira-Matias | G08G 1/202 |
| 2018/0204229 A1* | 7/2018 | Bateman | G06Q 30/0202 |

OTHER PUBLICATIONS

"World Urbanization Prospects", Economic & Social Affairs, Dec. 2014, pp. 1-32.

"Transport, Energy and $CO_2$, Moving Toward Sustainability", International Energy Agency, Dec. 2009, pp. 1-418.

Luis Moreira-Matias, et al., "Predicting Taxi-Passenger Demand using Streaming Data", IEEE Transactions on Intelligent Transportation Systems, vol. 14, issue 3, Sep. 2013, pp. 1-10.

Luis Moreira-Matias, et al., "On Predicting the Taxi-Passenger Demand: A Real-Time Approach", Progress in Artificial Intelligence, 16$^{th}$ Portuguese Conference on Artificial Intelligence, EPIA 2013, Sep. 2013 Proceedings, Sep. 9-12, 2013, pp. 54-64.

* cited by examiner

METHOD TO CONTROL VEHICLE FLEETS TO DELIVER ON-DEMAND TRANSPORTATION SERVICES

FIELD

The present invention relates to on-demand transport, and more particularly, to predictive dispatching systems and methods for on-demand transport.

BACKGROUND

On-demand transport (ODT) is an important and popular component of public transportation as it provides a generally faster, more comfortable, and more convenient door-to-door service relative to other forms of public transportation. In the past, ODT was provided primarily in the form of taxi services. However, other types of operators, e.g. car-sharing service providers, have recently begun to offer ODT services as well.

Meanwhile, technologies such as WiFi, 3G, and GPRS and GPS location services have enabled the ODT industry to improve traditional radio communication and manual dispatching services. As compared to traditional dispatching services, more advanced systems are now available where assignments are automatically dispatched from a central dispatcher and where drivers can communicate back to the central dispatcher with a simple click on, e.g., a tablet computer. Nevertheless, current dispatching systems are often driven by a message protocol that differs very little from the one provided by traditional radio-based dispatching services.

SUMMARY

In an embodiment, the present invention provides a method for providing dispatching services for an on-demand transportation (ODT) service. The method includes determining that a predictive assignment message should be transmitted to a vehicle, generating, in response to the determining that a predictive assignment should be transmitted to a vehicle, the predictive assignment message, and transmitting, to the vehicle, the predictive assignment message. Generating the predictive assignment message uses one or more prediction models computed from historical and real-time ODT service data.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

A predictive and collaborative framework for ODT dispatching systems is described herein. Such a predictive and collaborative framework not only increases profit but also improves utilization of resources such as communication system bandwidth and electric vehicle battery life. Various embodiments of the predictive and collaborative framework described herein are also resilient to drift, i.e. sensitive to sudden changes in demand. As compared to current and prior art dispatching systems and methods, the predictive and collaborative framework described herein provides for improved idle mileage to busy mileage ratios.

Figure 1:
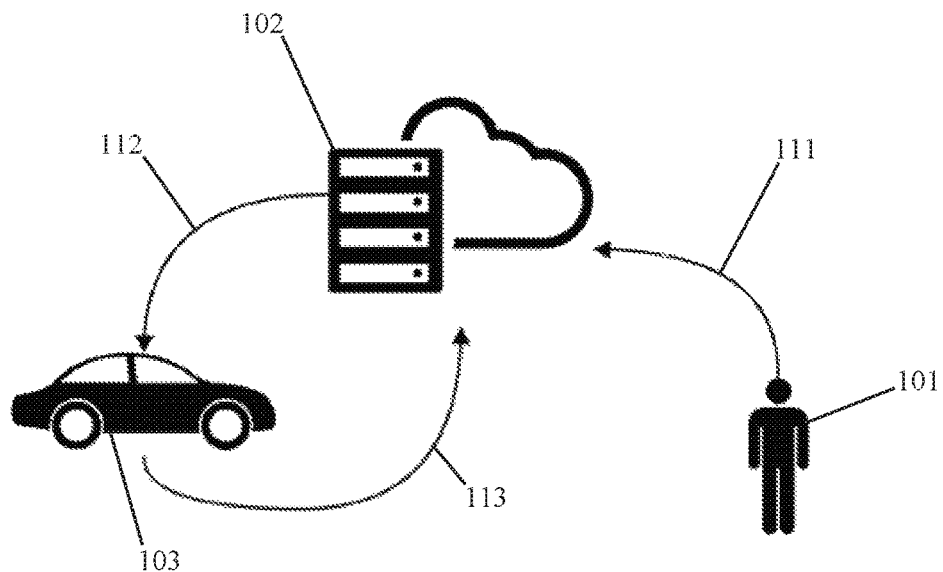
FIG. 1 depicts an illustrative example of a current or prior art reactive dispatching system for ODT services.

FIG. 1 depicts an illustrative example of a current or prior art reactive dispatching system for ODT services—such as the dispatching systems described by U.S. Patent Application Publication Nos. 2012/0130627 and 2015/0081362 and Japanese Patent Document No. JP 2004/295576. The reactive dispatching system of FIG. 1 operates as follows. First, user 101 issues a request to ODT server 102, e.g., via a smartphone application or a telephone call. The request is issued via communication channel 111 between the user 101 and the ODT server 102. Second, the ODT server 102 issues a tentative assignment of the service requested by the user 101 to a driver/vehicle 103. The tentative assignment is issued via downlink communication channel 112 from the ODT server 102 to the driver/vehicle 103. Third, the driver/vehicle 103 transmits a response to the tentative assignment to the ODT server 102. The response may be a confirmation accepting the tentative assignment or a rejection of the tentative assignment and is transmitted via an uplink communication channel 113 from the driver/vehicle 103 to the ODT server 102. Thereafter, if the driver/vehicle 103 has accepted the tentative assignment, the driver/vehicle performs the assigned service, which can include, e.g., passenger pick-up and drop-off. The reactive dispatching method of FIG. 1 relies on user locations and is entirely reactive to user requests. The spatiotemporal distribution of the vehicles of an ODT service provider implementing a dispatching method such as that of FIG. 1 is therefore dependent on driver experience and intuition for operating in a specific city or area during a specific time period so as to be well-positioned to minimize idle time and vacant cruising miles—as described by U.S. Patent Application Publication No. 2011/0099040 and Japanese Patent Document No. JP 2005/346634.

In such current and prior art reactive dispatching methods, after a driver/vehicle completes a drop-off, the next location of the driver/vehicle can be random and sub-optimal. Such random and sub-optimal locations of drivers/vehicles is likely to result in unnecessary idle mileage, i.e. mileage driven beyond the shortest path from a drop off location to the subsequent pick up location. Unnecessary idle mileage results in increased operating costs in the form of unnecessary additional wear and tear on vehicles and unnecessary increases in energy costs. Furthermore, unnecessary idle mileage is of particular concern for ODT service providers that utilize electric vehicles having limited battery capacity—particularly when the battery capacity of such electric vehicles is not sufficient to perform a complete shift (e.g. is less than ~8 hours) without recharging. Unnecessary idle mileage in the context of electric vehicles can result in an unnecessary increase in the ratio of vehicle down-time to operating time, and as the ratio of vehicle down-time to operating time increases, the fleet size required to meet a given level of demand for services increases as well thereby increasing the overhead for an ODT service provider.

As a result of the recent increase of urban areas and the ever-growing need to improve the utilization of environmental resources, e.g. limit $CO_2$ emissions, there is a growing trend of replacing traditional fossil-based vehicles driven by a human by a fleet of autonomous electric vehicles driven remotely. However, one of the limitations of electric vehicles is their limited battery life. Vacant cruising time represents one of the main key performance indicators (KPIs) to decrease in order for electric vehicle provided ODT services to remain competitive. Typically used random cruising passenger-finding heuristics (or nearest-stand heuristics) are not always sufficient in the context of electric vehicle provided ODT services.

The predictive and collaborative framework for ODT dispatching systems described herein provides for transmission of predictive assignment messages. Predictive assignments can be made, e.g., through a two-stage ensemble that performs a selection, from among various predictive models in multiple classes of predictive models, of a predictive model from each class in a first stage and then provides an output based on a combination of the selected predictive models. Such an ensemble can provide an output that is suitable for a particular mobility situation/context at a particular time within a particular city/area in which an ODT service provider is operating. The predictive and collaborative framework for ODT dispatching systems and methods described herein can considerably reduce energy consumption and improve fleet management. Furthermore, the predictive and collaborative framework for ODT dispatching systems and methods described herein can be resilient to drift and can leverage collaboration between a central dispatcher and a plurality of vehicles to improve utilization of resources.

Predictive assignment messages described herein allow for vehicles to be dispatched based on a prediction method of the spatiotemporal distribution of demand. The predictive and collaborative framework for ODT dispatching systems and methods described herein can adapt the predictions to current mobility scenarios in a city, e.g. rapid weather changes, car accidents, and large-scale sporting events.

Predictive assignment messages described herein can affect the location of individual drivers/vehicles and the aggregate distribution of drivers/vehicles and do so in a way that provides numerous benefits to ODT service providers. Drivers/vehicles of an ODT service provider typically experience, after a drop-off, a period of idle time before receiving a subsequent service assignment. Predictive assignment messages affect how the driver behaves in this idle period. Predictive assignment messages can be sent by a central dispatcher and/or a specific predictive assignment entity to instruct a driver/vehicle to relocate to an area where it is likely that the driver will receive a service assignment during an ensuing short-term horizon (which, ideally, could be the exact location where the driver/vehicle is located at that moment). Predictive assignment messages can thereby reduce unnecessary idle mileage and, in doing so, reduce unnecessary vehicle wear, reduce unnecessary fuel costs, conserve battery power and, over the long-term, battery lifetime.

By facilitating an improved distribution of drivers/vehicles across a city/area in which an ODT service provider operates, predictive assignment messages can also provide benefits to ODT service users, for example by reducing the average waiting time. Predictive assignment messages can be provided according to current patterns of demand (e.g. patterns of demand determined in real time or patterns of demand estimated from conditions present during an adjacent preceding time interval) and therefore ensure that the drivers/vehicles will be, on average, closer to the location at which users are located when they issue requests to an ODT server, e.g. and ODT central dispatcher server.

ODT service providers typically have a fleet of vehicles that is distributed over a number of locations. Using on-board devices, such vehicles can periodically and/or intermittently send status messages to a central server, e.g. a central ODT dispatcher server or a central predictive assignment server. Such messages can contain timestamped GPS traces as well as a variety of vehicle status indications, e.g. current passenger status, most recent passenger pick-up and/or drop-off location, next destination, vehicle motion status (e.g. moving or stopped, speed), vehicle fuel level and/or remaining vehicle battery life, etc. Similarly, users can request ODT services by transmitting a request from, e.g., a smart phone that includes a variety of information pertaining to the user, e.g. a timestamped GPS location, user status, requested destination, etc.

Predictive assignment methods and systems described herein can store the data included in the vehicle status messages and the service request messages at a database. Data included in vehicle status and service request messages received over a long period of time can be used to construct a historical data set that provides information concerning historical user demand and historical fleet status. Furthermore the data included in very recent status messages and service request messages can be used to construct a data set that provides information concerning real-time user demand and real-time fleet status. Predictive assignment methods described herein utilize such historical and real-time data to compute prediction models about ODT service demand in particular cities/areas on short-term time horizons. Furthermore, as additional vehicle status and service request messages are received, the information contained therein can be used to incrementally update the prediction models. Moreover, data that is outdated (e.g. data received from status messages and service request messages more than six months ago) can be removed from the database and the prediction models can be updated after the removal of said stale data.

Predictive assignment methods and systems described herein can generate predictive assignments for a driver/vehicle in response to receiving a passenger drop-off message from the driver/vehicle. Such predictive assignments can be generated based on a cooperative decision about a preferred next location based on a variety of factors including anticipated demand for ODT services, the current location of the particular vehicle, and the current status and location of other vehicles of the fleet.

Drivers/vehicles can accept or reject dispatching decisions in predictive assignment methods and systems described herein. For example, drivers/vehicles can decide to accept or reject dispatching decisions based on, e.g., traffic condition, battery status, etc. If a driver/vehicle accepts a dispatching decision, the driver/vehicle performs the instructions, e.g. the next service assignment, according to the dispatching decision. If a driver/vehicle declines a service assignment, the service assignment is reassigned to another available vehicle.

Predictive assignment methods and systems described herein can use a variety of prediction models and use an ensemble of such prediction models. The prediction models can include time-varying Poisson models, e.g. Poisson and Weighted Poisson models, and time-series analysis models, e.g. Autoregressive Integrated Moving Average (ARIMA) models and Vector Autoregression (VAR) models. The prediction models are based on different types of data. Time-varying Poisson models are long-term processes that leverage large amounts of historical data, while ARIMA and VAR rely on relatively more recent data and rely on historical records to only a limited degree in order to compute predictions. For each prediction model of the ensemble, a dataset based on the real-time and historical data can be defined.

The Poission models, the Weighted Poisson Models, and the ARIMA models can be computed as described in Moreira-Matias, Luis et al. "On Predicting the Taxi-Passenger Demand: A Real-Time Approach." *Portuguese Conference on Artificial Intelligence*. Springer Berlin Heidelberg, 2013.

The VAR model describes the evolution of multiple variables over the same sample period as a function of their past values. Demand experienced by a particular target ODT service stand, or area, can be determined by taking into account data from multiple other ODT service stands, or areas. The VAR model can therefore capture interdependencies between different data sources relative to different stands. The demand at one particular stand may be affected by the demand at the other stands in the city/or some area. The predictive assignment methods and systems described herein can use the VAR model and adapt it to respond to a time-varying environment, i.e. to a time-varying demand and time-varying dependencies between the ODT service stands or areas. The adaptation to such a time-varying environment can be performed by setting a selection criteria to select for a particular ODT service stand or area the set of ODT service stands or areas that will have their historical demand considered as input for VAR model for that particular service stand or area (instead of using the historical demand of all ODT service stands or areas as input for the VAR model for a particular ODT service stand or areas). The set of ODT service stands or areas that will have their historical demand considered as input for a VAR model for a particular service stand or area can be continuously updated through the use of change detection algorithms (e.g., a Hoeffding Bound test). In this manner, whenever a significant change in the dependencies between the ODT service stands or areas is detected, the set of ODT service stands or areas that serve as input to the VAR model can be updated.

The ODT service stands or areas that are to be considered by the VAR model along with the target stand or area (i.e. the top k stands or areas for which demand correlation values are highest) can be chosen according to the Pearson correlation. The Pearson correlation is a measure of linear dependencies between two variables. In the VAR model described herein, the Pearson correlation indicates the temporal correlation between the demand experienced at two different ODT service stands or areas. The choice of ODT service stands or areas that are to be considered by the model along with the target stand or area can be dependent on a correlation threshold, and a top-k stands or areas can be determined periodically, for instance every 24 h, by using a grid search over an incrementally updated validation set.

The choice of ODT service stands or areas that are to be considered by the model along with the target stand or area (i.e. the top-k stands) can be made according to a hyper-parameter tuning process. Such a hyper-parameter tuning process can include the following steps:

Separate the data into training and validation sets;
Choose an interval for the top-k (1 . . . $N_{max}$, where $N_{max}$ is a user defined parameter that depends on the performance of VAR model in the specific case of study) and an interval for the correlation threshold depending on the values of the correlation between the target stand and all other stands, thereby forming a grid of possible parameters;
For every pair of values from the grid, train the model on the training set and calculate the errors on the validation set; and
Choose the values for top-k and correlation threshold that yield the least error.

To ensure robustness of the model, predictive assignment methods and systems described herein can implement a so-called Hoeffding alarm. The Hoeffding alarm allows for detection of a significant change in the correlation structure between stands local to each VAR model—which affects the selection of the stands to be considered alongside the target stand by the VAR model. The correlation structure is the correlation values between different ODT service stands or areas. For example, the correlation values for the demand for ODT services at an ODT service stand or area near a sports arena located on the outskirts of a city and at ODT service stands or areas near public viewing areas in that city are likely to be high during time periods after the conclusion of a sporting event. However, at other time periods the correlation values will be low. In the VAR models, individual ODT service stands or areas can be defined by discrete time series describing the number of services requested and/or provided by such ODT service stands. In other words, the individual ODT service stands can be defined by discrete time series that describe the demand at the individual ODT service stand. The Hoeffding bound is tested periodically. If the Hoeffding alarm is triggered (as a result of the Hoeffding bound being exceeded), the stands to be considered alongside the target stand (i.e. the top k stands for which demand correlation values are highest) by the VAR model are re-selected.

For each period, predictive assignment methods and systems described herein can build a two-stage learning ensemble framework using the four models. The ensemble allows for smooth selection between one of the two types of models without discarding the results from the other, non-selected model(s). Predictive assignment methods and systems described herein use the Page-Hinkley test to monitor the residuals' distribution between the two time-varying Poisson processes and the two time series analysis models, resulting in the first stage of the ensemble process (i.e. a pure selection of two methods). Among each pair, the model with the lowest residuals is selected. The residuals are the difference between an observed value and the estimated value of the quantity of interest, which in this case is the demand experienced by a target ODT stand or area. The process of selecting the model with the lowest residuals thereby aims to continuously identify the best performing models (those with the least residuals) and accordingly form the ensemble therefrom. The second stage of the ensemble is performed by weighting each selected model according to a prediction error over a number of previous periods H, where the number of previous periods H is a hyperparameter, i.e. a sliding window. Such weighting can be performed as described in Moreira-Matias, Luis et al. "Predicting Taxi-Passenger Demand Using Streaming Data." *IEEE Transactions on Intelligent Transportation Systems*. 14.3 (2013): 1393-1402.

Predictive assignment methods and systems described herein can reduce prediction error and become more widely applicable through consideration of a VAR model that considers multiple time series from different stands to provide predictions for demand faced by individual ODT service stands or areas. Prediction error can be reduced through the use of an ensemble of predictive models that combines top performing models from among Poisson and Weighted Poisson models, and from among VAR and ARIMA models. Prediction error can be further reduced by weighting the contribution of each model to the ensemble according to their performance in a user-defined sliding window that determines a number of periods H and the prediction error of each model in those H periods. As demand for ODT services varies in both time and space, predictive assignment methods and systems described herein can use a method that resists drift by updating the prediction models to take into account not only historical data but also real-time data. Consequently, predictive assignment methods and systems described herein can quickly react to sudden changes in demand and ensure a better quality of service. Moreover, predictive assignment methods and systems described herein can provide dispatching decisions that are more optimal for a variety of ODT service providers, e.g. companies relying on a fleet of electric vehicles or a fleet of autonomous vehicles controlled by wires. By reducing the ratio of vacant miles to busy miles and by considering the location of charging stations for electric cars, predictive assignment methods and systems described herein can account for a considerable reduction in battery usage. In addition, the dispatching decisions provided by predictive assignment methods and systems described herein can reduce the bandwidth necessary for communication between a central dispatcher and the vehicles of an ODT service provider.

Figure 2:
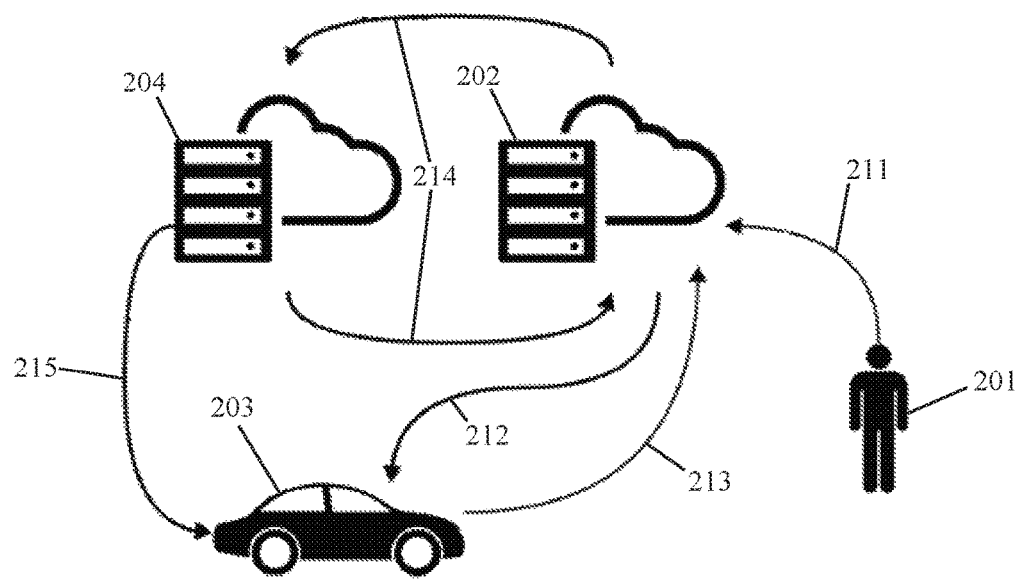
FIG. 2 is an illustrative example of a dispatching system for ODT services according to an embodiment of the invention.

FIG. 2 is an illustrative example of a dispatching system for ODT services according to an embodiment of the invention. The dispatching system of FIG. 2 operates as follows. First, user 201 issues a request to ODT dispatching server 202, e.g., via a smartphone application or a telephone call, and the ODT dispatching server 202 receives the request from the user 201. The request is received by the ODT dispatching server 202 via communication channel 211 between the user 201 and the ODT server 202. Second, the ODT server 202 issues a tentative assignment of the service requested by the user 201 to a driver/vehicle 203. The tentative assignment is issued via downlink communication channel 212 from the ODT server 202 to the driver/vehicle 203. Third, the driver/vehicle 203 transmits a response to the tentative assignment to the ODT server 202 and the ODT server 202 receives the response from the driver/vehicle 203. The response may be a confirmation accepting the tentative assignment or a rejection of the tentative assignment and is transmitted via an uplink communication channel 213 from the driver/vehicle 203 to the ODT server 202. The response may be determined according to a current vehicle status, e.g. remaining vehicle battery life. Thereafter, if the driver/vehicle 203 has accepted the tentative assignment, the driver/vehicle performs the assigned service, which can include, e.g., passenger pick-up and drop-off. Following a passenger drop-off event, the driver/vehicle 203 transmits a passenger drop-off notification via the uplink communication channel 213 to the ODT server 202 and the ODT server receives the passenger drop-off notification from the driver/vehicle 203. The passenger drop-off notification may include a variety of information including, e.g., timestamped GPS location data, vehicle status data, vehicle fuel level and/or vehicle battery life, etc.

Upon receipt of the passenger drop-off notification, the ODT server 202 informs a predictive assignment server 204 that the driver/vehicle 203 has completed a passenger drop-off and forwards relevant information provided with the passenger drop-off notification to the predictive assignment server 204. Information can be transmitted between the ODT server 202 and the predictive assignment server 204 via communication link 214. The predictive assignment server 204 utilizes that information to determine a location to which to redirect the driver/vehicle 203 and thereafter transmits a predictive assignment message to the driver/vehicle 203 that redirects the driver/vehicle 203 to the determined location. The predictive assignment message can be transmitted via the downlink communication channel 215. The location determined by the predictive assignment server 204 can be selected to minimize the expected distance traveled prior to a subsequent passenger pick-up event or to optimize some other parameter. The location to which the driver/vehicle 203 is redirected by the predictive assignment server 204 can be determined according to various predictive models including time-varying Poisson models, e.g. Poisson and Weighted Poisson models, and time-series analysis models, e.g. Autoregressive Integrated Moving Average (ARIMA) models and Vector Autoregression (VAR) models. The location to which the driver/vehicle 203 is redirected by the predictive assignment server 204 is determined according to an ensemble of a plurality of different predictive models.

In some embodiments, the ODT server 202 and the predictive assignment server 204 may be located at the same physical location and (in some of those embodiments) the ODT server 202 and the predictive assignment server 204 both include the same processors and/or memory.

In some embodiments, the driver/vehicle 203 is configured to intermittently and/or periodically issue vehicle status messages to the ODT server 202 and/or the predictive assignment server 204. Such status messages may include a variety of information including, e.g., timestamped GPS location data, vehicle status data, vehicle fuel level and/or vehicle battery life, etc. The information included in the vehicle status messages can be stored at a database by the ODT server 202 and/or by the predictive assignment server 204. Such a database can be located at the ODT server 202, at the predictive assignment server 204, or at some other location. The information included in the vehicle status messages can then be utilized by the ODT server 202 and/or the predictive assignment relevant server 204 in order to determine a location to which to redirect drivers/vehicles, such as the driver/vehicle 203. For example, the information included in the vehicle status messages can be incorporated into the various predictive models used by the predictive assignment server 204. Furthermore, the information included in the vehicle status messages can be used to construct and/or update historical vehicle status data that can also be incorporated into the various predictive models used by the predictive assignment server 204.

Similarly, in some embodiments, the predictive assignment server 204 is configured to periodically and/or intermittently issue predictive assignment messages to a subset of the vehicles. For example, the predictive assignment server 204 may periodically and/or intermittently issue predictive assignment messages to all drivers/vehicles that the ODT server 202 and/or the predictive assignment server 204 identify as not currently providing a service to a user, e.g. having a current status of vacant and/or idle. In some such embodiment, the drivers/vehicles receiving such predictive assignment messages can respond to the predictive assignment messages. The response may be a confirmation accepting the accepting the instructions provided by the predictive assignment message or a rejection of the predictive assignment message. The response may be determined according to a current vehicle status, e.g. remaining vehicle battery life.

Figure 3:
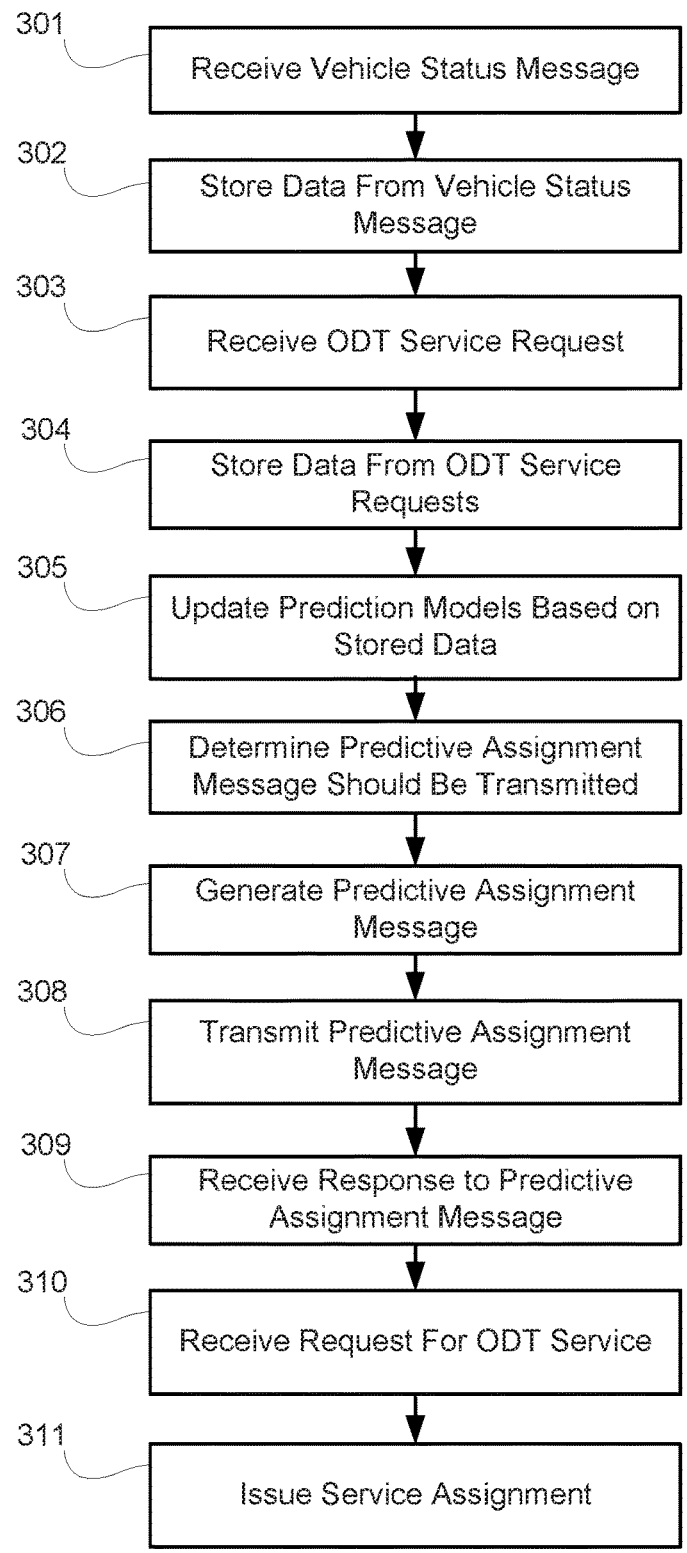
FIG. 3 is a flow chart for a dispatching method for ODT services according to an embodiment of the invention.

FIG. 3 is a flow chart for a dispatching method for ODT services. At 301, a central dispatching server receives vehicle status messages. The vehicle status messages can include timestamped GPS location data, vehicle status data, vehicle fuel level and/or vehicle battery life, etc. At 302, the central dispatching server stores data included in or derived from the vehicle status messages received at 301. The data can be stored at a database of the central dispatching server or a memory store located remotely from the central dispatching server.

At 303, the central dispatching server receives, from users, ODT service requests. The ODT service requests can include timestamped GPS location data, a desired pick-up location, a desired drop-off location, etc. At 304, the central dispatching server stores data included in or derived from the ODT serve requests received at 303. The data can be stored at a database of the central dispatching server or a memory store located remotely from the central dispatching server.

At 305, the central dispatching server updates prediction models based on the data stored at 302 and 304. The prediction models can include including time-varying Poisson models, e.g. Poisson and Weighted Poisson models, and time-series analysis models, e.g. Autoregressive Integrated Moving Average (ARIMA) models and Vector Autoregression (VAR) models.

At 306, the central dispatching server determines that a predictive assignment message should be transmitted to a driver/vehicle. The central dispatching server can determine that a predictive assignment message should be transmitted to a driver/vehicle in response to the receipt of a drop-off message from the driver/vehicle or that a predetermined amount of time has elapsed since the latter of the last pick-up message was received from the driver/vehicle or the last predictive assignment message was transmitted to the vehicle.

At 307, the central dispatching server generates a predictive assignment message for the driver/vehicle. The predictive assignment message can be generated according to the prediction models updated at 305. For example, the At 308, the central dispatching server transmits the predictive assignment message to the driver/vehicle. The predictive assignment message can provide a location to which the driver/vehicle is instructed to relocate to. At 309, the central dispatching server receives a response to the predictive assignment message from the driver/vehicle. The response to the predictive assignment message can indicate that the driver/vehicle has accepted instructions provided by the predictive assignment message or that the driver/vehicle has declined the instructions provided by the predictive assignment message.

At 310, the central dispatching server receives a request for an ODT service from a user. The service request can include, e.g., timestamped GPS location data, a desired pick-up location, a desired drop-off location, etc. At 311, the central dispatching server issues a service assignment in response to the request for an ODT service received at 310. The service assignment can be issued to a vehicle based on, e.g., a desired pick-up location for the ODT service request and a location included in a predictive assignment message transmitted to the vehicle to which the service assignment is issued.

Figure 4:
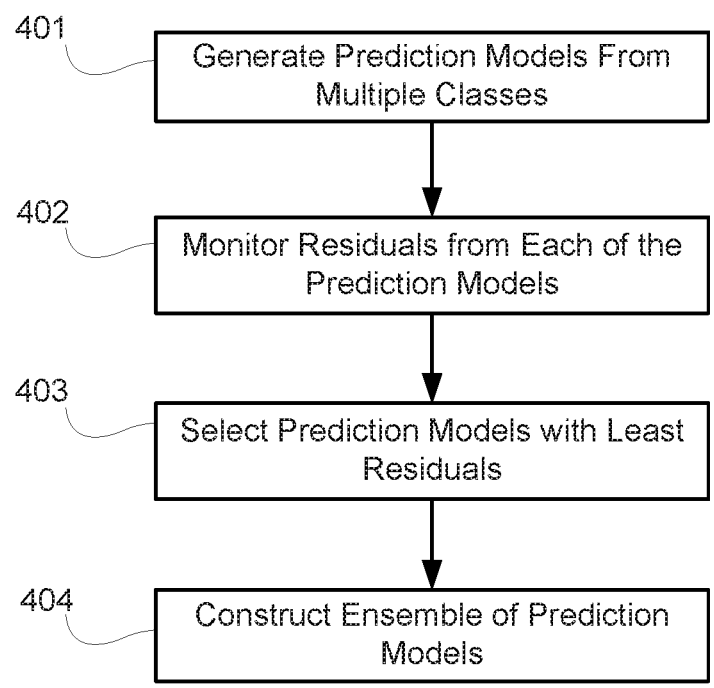
FIG. 4 is a flow chart for a method for selecting a prediction model from a plurality of prediction models for which to utilize in providing predictive assignment methods.

FIG. 4 is a flow chart for a method for selecting a prediction model from a plurality of prediction models for which to utilize in providing predictive assignment methods. At 401, a variety of prediction models from multiple classes are generated. Specifically, a variety of time-varying Poisson models and a variety of time-series analysis models are generated. At 402, the residuals of each of the individual prediction models from each of the multiple classes of prediction models are generated. At 403, an individual model having the least residuals is selected from each of the multiple classes of prediction models. At 404, an ensemble of the individual prediction models selected at 403 is constructed.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for automatically distributing vehicles capable of performing on-demand transportation (ODT) services, the method comprising:
   determining that a predictive assignment message should be transmitted to a vehicle;
   generating, in response to the determining that a predictive assignment should be transmitted to a vehicle, the predictive assignment message; and
   transmitting, to the vehicle, the predictive assignment message,
   wherein generating the predictive assignment message is performed using at least two prediction models,
   wherein each of the at least two prediction models is generated based, at least in part, on historical ODT service data,
   wherein the at least two prediction models include one or more time-varying Poisson models and one or more time-series analysis models.

2. The method of claim 1, further comprising:
receiving, from the vehicle, a response to the predictive assignment message,
wherein the response to the predictive assignment messages includes one of an acceptance of the predictive assignment or a denial of the predictive assignment.

3. The method of claim 1, further comprising:
receiving, from a user, a request for an ODT service; and
assigning, based at least in part on a location of the user and a location included in the predictive assignment message, the requested ODT service to the vehicle.

4. The method of claim 1, further comprising:
receiving, from a plurality of users during a current time interval, a plurality of requests for ODT services; and
updating, according to the plurality of requests for ODT services, the real-time ODT service data.

5. The method of claim 4, wherein the plurality of requests for ODT services each includes a starting location for the requested ODT service.

6. The method of claim 1, wherein determining that a predictive assignment message should be transmitted to a vehicle comprises at least one of:
determining that a drop-off message has been received from the vehicle, or
determining that a predetermined duration of time has elapsed since the latter of a previous predictive assignment message has been transmitted to the vehicle or a pick-up message has been received from the vehicle.

7. The method of claim 6, wherein the drop-off message includes one or more of a timestamped GPS location, a vehicle fuel level, or a vehicle battery life.

8. The method of claim 1, wherein the one or more time-varying Poisson models include a weighted Poisson model.

9. The method of claim 8, wherein the one or more time-series analysis models include at least one of an autoregressive integrated moving average (ARIMA) model or a vector autoregression (VAR) models.

10. The method of claim 1, wherein generating the predictive assignment message using at least two prediction models comprises:
selecting, from the one or more time-varying Poisson models, a first time-varying Poisson model,
selecting, from the one or more time-series analysis models, a first time-series analysis model,
constructing an ensemble of prediction models that includes the first time-varying Poisson model and the first time-series analysis model, and
generating, using the ensemble of prediction models, the predictive assignment message.

11. The method of claim 10, wherein constructing the ensemble of prediction models includes weighting a contribution of the first time-varying Poisson model to the ensemble and weighting a contribution of the first time-series analysis model to the ensemble.

12. The method according to claim 11, wherein weighting the contribution of the first time-varying Poisson model to the ensemble and weighting the contribution of the first time-series analysis model to the ensemble is performed according to a prediction error of the first time-varying Poisson model over a number of previous periods of time and according to a prediction error of the first time-series analysis model over the number of previous periods of time.

13. The method of claim 10, wherein selecting the first time-varying Poisson model includes:
determining, for each respective time-varying Poisson model of the one or more time-varying Poisson models, a difference between an observed demand for ODT services and a demand predicted by the respective time-varying Poisson model, and
selecting, as the first time-varying Poisson model, a respective time-varying Poisson model having a smallest difference between the observed demand for ODT services and the demand predicted thereby, and
wherein selecting the first time-series analysis model includes:
determining, for each respective time-series analysis model of the one or more time-series analysis models, a difference between an observed demand for ODT services and a demand predicted by the respective time-series analysis model, and
selecting, as the first time-series analysis model, a respective time-series analysis model having a smallest difference between the observed demand for ODT services and the demand predicted thereby.

14. The method of claim 1, wherein the vehicle is an autonomously driven vehicle.

15. The method according to claim 1, wherein the historical ODT service data is historical ODT service data for a set of ODT service stands.

16. The method according to claim 15, wherein members of the set of ODT service stands are a target ODT service stand and one or more additional ODT service stands.

17. The method according to claim 16, wherein the one or more additional ODT service stands are service stands having demand correlations with the target service stand that exceed a correlation threshold.

18. The method according to claim 17, wherein a Hoeffding alarm is triggered to indicate a significant change in correlation structure between the members of the set of ODT service stands, and
wherein the members of the set of ODT service stands are reselected in response to the Hoeffding alarm being triggered.

19. A system for automatically distributing vehicles capable of performing on-demand transportation (ODT) services, the system comprising:
a central ODT dispatcher server operable to:
determine that a predictive assignment message should be transmitted to a vehicle;
generate, in response to the determining that a predictive assignment should be transmitted to a vehicle, the predictive assignment message; and
transmit, to the vehicle, the predictive assignment message,
wherein generating the predictive assignment message is performed using at least two prediction models,
wherein each of the at least two prediction models is generated based, at least in part, on historical ODT service data,
wherein the at least two prediction models include one or more time-varying Poisson models and one or more time-series analysis models.

20. A non-transitory computer readable medium having stored thereon a set of processor executable instructions for executing a method for automatically distributing vehicles capable of performing on-demand transportation (ODT) services, the processor executable instructions comprising instructions for:
determining that a predictive assignment message should be transmitted to a vehicle:
generating, in response to the determining that a predictive assignment should be transmitted to a vehicle, the predictive assignment message; and transmitting, to the vehicle, the predictive assignment message,
wherein generating the predictive assignment message is performed using at least two prediction models,
wherein each of the at least two prediction models is generated based, at least in part, on historical ODT service data,
wherein the at least two prediction models include one or more time-varying Poisson models and one or more time-series analysis models.

* * * * *